United States Patent
Lv et al.

(10) Patent No.: US 12,460,090 B2
(45) Date of Patent: Nov. 4, 2025

(54) PROTECTIVE COATING LAYER, AND PREPARATION METHOD AND USE THEREOF

(71) Applicant: ELECTRIC POWER RESEARCH INSTITUTE OF GUANGDONG POWER GRID CO., LTD., Guangdong (CN)

(72) Inventors: Wangyan Lv, Guangdong (CN); Yongchun Liang, Guangdong (CN); Yingchao Yue, Guangdong (CN)

(73) Assignee: ELECTRIC POWER RESEARCH INSTITUTE OF GUANGDONG POWER GRID CO., LTD., Guangzhou (CN)

( * ) Notice: Subject to any disclaimer, the term of this patent is extended or adjusted under 35 U.S.C. 154(b) by 520 days.

(21) Appl. No.: 17/801,793

(22) PCT Filed: Dec. 21, 2020

(86) PCT No.: PCT/CN2020/137945
§ 371 (c)(1),
(2) Date: Aug. 24, 2022

(87) PCT Pub. No.: WO2022/036970
PCT Pub. Date: Feb. 24, 2022

(65) Prior Publication Data
US 2023/0082072 A1 Mar. 16, 2023

(30) Foreign Application Priority Data
Aug. 20, 2020 (CN) ............ 202010844536.7

(51) Int. Cl.
| | | |
|---|---|---|
| C09D 5/10 | (2006.01) |
| B05D 5/06 | (2006.01) |
| B05D 7/00 | (2006.01) |
| B05D 7/14 | (2006.01) |
| C09D 5/00 | (2006.01) |
| C09D 7/20 | (2018.01) |
| C09D 7/45 | (2018.01) |
| C09D 7/61 | (2018.01) |
| C09D 7/63 | (2018.01) |
| C09D 127/12 | (2006.01) |
| C09D 163/00 | (2006.01) |

(52) U.S. Cl.
CPC .............. C09D 5/106 (2013.01); B05D 5/062 (2013.01); B05D 7/148 (2013.01); B05D 7/5883 (2013.01); C09D 5/002 (2013.01); C09D 7/20 (2018.01); C09D 7/45 (2018.01); C09D 7/61 (2018.01); C09D 7/63 (2018.01); C09D 127/12 (2013.01); C09D 163/00 (2013.01)

(58) Field of Classification Search
CPC .......... C09D 5/106; C09D 5/002; C09D 7/20; C09D 7/45; C09D 7/61; C09D 7/63; C09D 127/12; C09D 163/00; B05D 5/062; B05D 7/148; B05D 7/5883
See application file for complete search history.

(56) References Cited

U.S. PATENT DOCUMENTS 6,660,793 B1 * 12/2003 McIntyre ............. C09D 17/001
524/556

FOREIGN PATENT DOCUMENTS

| CN | 101701125 A | * | 5/2010 | |
|---|---|---|---|---|
| CN | 101987937 A | | 3/2011 | |
| CN | 102031053 A | | 4/2011 | |
| CN | 102312235 A | | 1/2012 | |
| CN | 102702876 A | | 10/2012 | |
| CN | 111040526 A | * | 4/2020 | ............... B05D 7/14 |

OTHER PUBLICATIONS

Machine Translation of Chen (CN 111040526 A) (Year: 2020).*
Machine Translation of Jingran (CN 102312235 A) (Year: 2012).*
Machine Translation of Ningna (CN 102031053 A) (Year: 2011).*
Machine Translation of Jiangang (CN 101701125 A) (Year: 2010).*
International Search Report of PCT Patent Application No. PCT/CN2020/137945 issued on Apr. 25, 2021.

* cited by examiner

*Primary Examiner* — Callie E Shosho
*Assistant Examiner* — Bethany M Miller (57) ABSTRACT

Disclosed are a protective coating layer, and a preparation method and use thereof. The present application provides a protective coating layer, including: a rusty-surface liquid layer, a nano-zinc yellow epoxy primer layer, a nano-epoxy micaceous iron oxide (MIO) intermediate coating layer, and a nano-fluorocarbon top coating layer, where the rusty-surface liquid layer is applied on a metal substrate; the nano-zinc yellow epoxy primer layer is applied on a surface of the rusty-surface liquid layer; the nano-epoxy MIO intermediate coating layer is applied on a surface of the nano-zinc yellow epoxy primer layer; and the nano-fluorocarbon top coating layer is applied on a surface of the nano-epoxy MIO intermediate coating layer. The present application effectively solves the technical problem that the existing protective coating layer with nanoparticles exhibits poor adhesion to a substrate and cannot provide a protective effect for a long time.

10 Claims, 3 Drawing Sheets

PROTECTIVE COATING LAYER, AND PREPARATION METHOD AND USE THEREOF

The present application claims priority to Chinese Patent Application No. 202010844536.7 filed to the China National Intellectual Property Administration (CNIPA) on Aug. 20, 2020, and entitled "PROTECTIVE COATING LAYER, AND PREPARATION METHOD AND USE THEREOF", which is incorporated herein by reference in its entirety.

TECHNICAL FIELD

The present application belongs to the technical field of steel protection, and in particular relates to a protective coating layer, and a preparation method and use thereof.

BACKGROUND

Organic coatings are widely used in the protection of steel, and the adhesion between a coating layer and a substrate is the key to the protective effect of the coating. With the prolongation of service time, an organic coating will gradually lose its protective performance, and a substrate will be corroded and rusted, such that a new coating layer needs to be applied. During the application, the rust generated can destroy the adhesion between the new coating layer and the substrate. In most of the traditional processes, before a coating layer is applied, a corroded surface is subjected to a rust removal pretreatment by sandblasting and other methods to ensure the adhesion between an organic coating layer and a substrate. However, the rust removal brings heavy dust and noise pollution, and is greatly limited by a structure and location of a component.

An effective way to prevent the corrosion of steel is to apply a coating to a surface of the steel. The corrosion resistance of the coating directly affects the service life of steel. In recent years, a lot of research has been conducted on coatings, and traditional coatings have been modified by different methods to obtain high-performance coatings. Among the various technologies to improve the performance of coatings, the nanotechnology plays a driving role in the development of the coatings industry.

The stable existence of nanoparticles in coatings is the key to the wide application of the nanotechnology in the coatings industry. Due to the existence of a surface effect of a nanomaterial, nanoparticles are prone to collision and agglomeration, and cannot exist stably in a coating, which affects the performance of a nanocomposite coating. Therefore, in the preparation of a nanocomposite coating, how to effectively disperse nanoparticles into the coating is the key to preparing the nanocoating and ensuring the stable existence of nanoparticles in the coating.

However, due to the instability of nanoparticles in a protective coating layer slurry, the agglomeration easily occurs, such that the existing protective coating layer with nanoparticles exhibits poor adhesion to a substrate and cannot provide a protective effect for a long time.

SUMMARY

Given this, the present application discloses a protective coating layer and a preparation method thereof, which effectively solves the technical problem that the existing protective coating layer with nanoparticles exhibits poor adhesion to a substrate and cannot provide a protective effect for a long time.

In a first aspect, the present application provides a protective coating layer, including: a rusty-surface liquid layer, a nano-zinc yellow epoxy primer layer, a nano-epoxy micaceous iron oxide (MIO) intermediate coating layer, and a nano-fluorocarbon top coating layer, where the rusty-surface liquid layer is applied on a metal substrate; the nano-zinc yellow epoxy primer layer is applied on a surface of the rusty-surface liquid layer; the nano-epoxy MIO intermediate coating layer is applied on a surface of the nano-zinc yellow epoxy primer layer; and the nano-fluorocarbon top coating layer is applied on a surface of the nano-epoxy MIO intermediate coating layer; where a slurry of the rusty-surface liquid layer includes a weak acid, a sodium salt, and a surfactant, where the weak acid is one or more selected from the group consisting of phosphoric acid, tannic acid, acetic acid, oxalic acid, phytic acid, and citric acid, the sodium salt is sodium molybdate and/or sodium phytate, and the surfactant is one or more selected from the group consisting of sodium dodecylbenzenesulfonate (SDBS), isopropyl alcohol (IPA), tertiary butyl alcohol (TBA), polyethylene glycol (PEG), n-butyl alcohol (NBA), and glycerol;
  a slurry of the nano-zinc yellow epoxy primer layer includes an epoxy resin, a dispersing agent, zinc phosphate, iron oxide yellow, talc powder, a filler, a mixed solvent, and a curing agent, where the filler is one or more selected from the group consisting of a nano-aluminum powder (NAP), a nano-zirconium powder (NZP), and nano-silicon dioxide;
  a slurry of the nano-epoxy MIO intermediate coating layer includes an epoxy resin, a dispersing agent, talc powder, MIO, a filler, a mixed solvent, and a curing agent, where the filler is one or more selected from the group consisting of NAP, NZP, and nano-silicon dioxide; and
  the nano-fluorocarbon top coating layer includes a fluorocarbon resin, a defoaming agent, a polyamide (PA) wax, a mixed solvent, a filler, a solvent, and a curing agent, where the filler is one or more selected from the group consisting of NAP, NZP, and nano-silicon dioxide.

It should be noted that tannic acid rapidly reacts with a surface of a rusty layer under the promotion of sodium molybdate and citric acid to produce an iron tannate conversion film with microcracks, and the bonding between the nano-zinc yellow epoxy primer layer and the conversion film is enhanced through the mechanical interlocking effect and the generation of chemical bonds; and the mixed alcohol promotes the penetration of the tannic acid into the rusty layer to react, which not only makes the rusty layer denser, but also promotes the bonding between the conversion film and the rusty layer. It can be seen that the tannic acid in the rusty-surface liquid layer can react with a rusty layer of a substrate to produce an iron tannate conversion film with microcracks on the surface of the rusty layer. Moreover, part of the tannic acid penetrates the porous inner rusty layer to allow a reaction, which increases a density of the inner rusty layer, improves the cohesion of the rusty layer, and is beneficial to the improvement of the adhesion of the entire coating system. In addition, according to a chemical equation between the tannic acid and the rusty layer, one iron ion can chelate with three tannic acid molecules, and the tannic acid, as a macromolecular compound, can also react with multiple iron ions, such that a mesh-like interwoven structure is produced, with one part of this structure in the iron tannate conversion film on the surface and the other part of this structure in the inner rusty layer, which improves the bonding between the iron tannate conversion film and the inner rusty layer. When applied, the nano-zinc yellow epoxy primer slurry easily penetrates through the microcracks of the iron tannate into the conversion film, and the large number of microcracks increase a contact area between the coating and the conversion film, which is beneficial to the strong bonding of the nano-zinc yellow epoxy primer layer to the conversion film through the mechanical interlocking effect. In addition, the tannic acid is a multifunctional compound, and active functional groups in the produced iron tannate conversion film can form chemical bonds with active functional groups in the nano-zinc yellow epoxy primer layer, which also improves the bonding between the conversion film and the nano-zinc yellow epoxy primer layer. Through the promotion of adhesion described in the above four aspects, the adhesion of the nano-zinc yellow epoxy primer layer/rusty-surface liquid layer coating system for steel substrates is greatly improved after the treatment involving tannic acid.

Preferably, a slurry of the rusty-surface liquid layer may specifically include:
  tannic acid: 5 g/L to 20 g/L;
  phosphoric acid: 0 g/L to 200 g/L;
  sodium molybdate: 1 g/L to 4 g/L;
  citric acid: 1 g/L to 4 g/L;
  mixed alcohol: 5 g/L to 20 g/L, where the mixed alcohol includes IPA and TBA, and a mass ratio of the IPA to the TBA is 1:1; and
  SDBS: 0.5 g/L to 5 g/L.

More preferably, the slurry of the rusty-surface liquid layer may specifically include:
  tannic acid: 15 g/L;
  phosphoric acid: 50 g/L;
  sodium molybdate: 4 g/L;
  citric acid: 1 g/L;
  mixed alcohol: 20 g/L, where the mixed alcohol includes IPA and TBA, and a mass ratio of the IPA to the TBA is 1:1; and
  SDBS: 1 g/L.

It is found in the present application that the combination of tannic acid and phosphoric acid can effectively improve the adhesion, and the phosphoric acid can provide suitable hydrogen and phosphate ion concentrations for the rusty-surface liquid layer to effectively control a reaction rate between a slurry of the rusty-surface liquid layer and a rusty layer, such that narrow channels conducive to the penetration of the slurry of the rusty-surface liquid layer are formed in the conversion film, which increases a conversion degree of the rusty layer to finally produce a conversion film with strong cohesion. In addition, the conversion film with microcracks and active functional groups can be well bonded with the nano-zinc yellow epoxy primer layer.

Preferably, a slurry of the rusty-surface liquid layer may have a pH of 2 to 5.

Preferably, a slurry of the nano-zinc yellow epoxy primer layer may specifically include a component A and a component B, and a mass ratio of the component A to the component B may be 1:1 to 10:1;
  the component A may include:

| | |
|---|---|
| epoxy resin | 20% to 50%; |
| dispersing agent | 0.1% to 1%; |
| zinc phosphate | 20% to 30%; |
| iron oxide yellow | 1% to 5%; |
| talc powder | 10% to 30%; |
| NAP | 0% to 10%; |
| NZP | 0% to 10%; |
| nano-silicon dioxide | 0% to 10%; and |
| mixed solvent | 0% to 30%; and | the component B may include:

| | |
|---|---|
| mixed solvent | 30% to 70%; and |
| curing agent | 30% to 70%. |

Preferably, the mass ratio of the component A to the component B may be 5:1.

At least one of the contents of the NAP, the NZP, and the nano-silicon dioxide may not be 0.

Preferably, a slurry of the nano-epoxy MIO intermediate coating layer may specifically include a component C and a component D, and a mass ratio of the component C to the component D may be 1:1 to 10:1;
  the component C may include:

| | |
|---|---|
| epoxy resin | 20% to 50%; |
| dispersing agent | 0.1% to 1%; |
| talc powder | 10% to 30%; |
| MIO | 10% to 50%; |
| NAP | 0% to 5%; |
| NZP | 0% to 5%; |
| nano-silicon dioxide | 0% to 5%; and |
| mixed solvent | 0% to 30%; and | the component D may include:

| | |
|---|---|
| mixed solvent | 30% to 70%; and |
| curing agent | 30% to 70%. |

Preferably, the mass ratio of the component C to the component D may be 5:1.

At least one of the contents of the NAP, the NZP, and the nano-silicon dioxide may not be 0.

Preferably, a slurry of the nano-fluorocarbon top coating layer may specifically include a component E and a component F, and a mass ratio of the component E to the component F may be 5:1 to 10:1;
  the component E may include:

| | |
|---|---|
| fluorocarbon resin | 30% to 80%; |
| defoaming agent | 0.1% to 1%; |
| PA wax | 0.1% to 1%; |
| NAP | 0% to 20%; |
| NZP | 0% to 5%; |
| nano-silicon dioxide | 0% to 5%; and |
| mixed solvent | 0% to 40%; and | the component F may include:

| | |
|---|---|
| solvent | 10% to 50%; and |
| curing agent | 50% to 90%. |

Preferably, the mass ratio of the component E to the component F may be 10:1.

At least one of the contents of the NAP, the NZP, and the nano-silicon dioxide may not be 0.

It is found in the present application that a nano-zinc yellow epoxy primer layer, a nano-epoxy MIO intermediate coating layer, and a nano-fluorocarbon top coating layer that are each prepared by mixing the NAP with an epoxy resin system or a fluorocarbon resin system have significantly-improved corrosion resistance, and X-ray photoelectron spectroscopy (XPS) analysis results of corroded products show that Al preferentially participates in a corrosion reaction, and products thereof are $Al_2O_3$ and AlOOH or $Al(OH)_3$, which realizes the sacrificial anode protection to protect a metal substrate; a nano-zinc yellow epoxy primer layer, a nano-epoxy MIO intermediate coating layer, and a nano-fluorocarbon top coating layer that are each prepared by mixing the NZP with an epoxy resin system or a fluorocarbon resin system have significantly-improved corrosion resistance; and a nano-zinc yellow epoxy primer layer, a nano-epoxy MIO intermediate coating layer, and a nano-fluorocarbon top coating layer that each include nano-silicon dioxide have significantly-improved corrosion resistance.

Specifically, the curing agent in the component B and the curing agent in the component D may be PA curing agents; and the curing agent in the component F may be an aliphatic polyisocyanate (hexamethylene diisocyanate (HDI) trimer), a curing agent N3390 purchased from the Bayer, Germany.

Specifically, the mixed solvent in each of the component A and the component B may include xylene and NBA, and a volume ratio of the xylene to the NBA may be 7:3; the mixed solvent in each of the component C and the component D may include xylene and NBA, and a volume ratio of the xylene to the NBA may be 7:3; the mixed solvent in the component E may include xylene and butyl acetate, and a volume ratio of the xylene to the butyl acetate may be 7:3; and the solvent in the component F may be butyl acetate.

Specifically, an adjuvant of the present application may include one or more selected from the group consisting of a defoaming agent, a leveling agent, and an anti-settling agent.

In a second aspect, the present application provides a preparation method of the protective coating layer, including the following steps:

step 1. preparing a slurry of the rusty-surface liquid layer, a slurry of the nano-zinc yellow epoxy primer layer, a slurry of the nano-epoxy MIO intermediate coating layer, and a slurry of the nano-fluorocarbon top coating layer;

step 2. applying the slurry of the rusty-surface liquid layer on a metal substrate;

step 3. applying the slurry of the nano-zinc yellow epoxy primer layer on a surface of the rusty-surface liquid layer;

step 4. applying the slurry of the nano-epoxy MIO intermediate coating layer on a surface of the nano-zinc yellow epoxy primer layer; and step 5. applying the slurry of the nano-fluorocarbon top coating layer on a surface of the nano-epoxy MIO intermediate coating layer, where the slurry of the rusty-surface liquid layer includes a weak acid, a sodium salt, and a surfactant, where the weak acid is one or more selected from the group consisting of phosphoric acid, tannic acid, acetic acid, oxalic acid, phytic acid, and citric acid, the sodium salt is sodium molybdate and/or sodium phytate, and the surfactant is one or more selected from the group consisting of SDBS, IPA, TBA, PEG, NBA, and glycerol;

the slurry of the nano-zinc yellow epoxy primer layer includes an epoxy resin, a dispersing agent, zinc phosphate, iron oxide yellow, talc powder, a filler, a mixed solvent, and a curing agent, where the filler is one or more selected from the group consisting of NAP, NZP, and nano-silicon dioxide;

the slurry of the nano-epoxy MIO intermediate coating layer includes an epoxy resin, a dispersing agent, talc powder, MIO, a filler, a mixed solvent, and a curing agent, where the filler is one or more selected from the group consisting of NAP, NZP, and nano-silicon dioxide; and the slurry of the nano-fluorocarbon top coating layer includes a fluorocarbon resin, a defoaming agent, a PA wax, a mixed solvent, a filler, a solvent, and a curing agent, where the filler is one or more selected from the group consisting of NAP, NZP, and nano-silicon dioxide.

Preferably, a preparation method of the slurry of the nano-zinc yellow epoxy primer layer may specifically include:

1.1 mixing the dispersing agent, the mixed solvent, and the filler to obtain a nano-filler slurry, where the filler is one or more selected from the group consisting of NAP, NZP, and nano-silicon dioxide;

1.2 mixing the nano-filler slurry with the epoxy resin, the zinc phosphate, the iron oxide yellow, and the talc powder to obtain a component A; and mixing the mixed solvent and the curing agent to obtain a component B; and 1.3 mixing the component A and the component B to obtain the slurry of the nano-zinc yellow epoxy primer layer.

The slurry of the nano-zinc yellow epoxy primer layer may specifically include a component A and a component B, and a mass ratio of the component A to the component B may be 1:1 to 10:1;

the component A may include:

| epoxy resin | 20% to 50%; |
|---|---|
| dispersing agent | 0.1% to 1%; |
| zinc phosphate | 20% to 30%; |
| iron oxide yellow | 1% to 5%; |
| talc powder | 10% to 30%; |
| NAP | 0% to 10%; |
| NZP | 0% to 10%; |
| nano-silicon dioxide | 0% to 10%; and |
| mixed solvent | 0% to 30%; | and
the component B may include:

| mixed solvent | 30% to 70%; and |
|---|---|
| curing agent | 30% to 70%. |

Preferably, a preparation method of the slurry of the nano-epoxy MIO intermediate coating layer may specifically include:

2.1 mixing the dispersing agent, the mixed solvent, and the filler to obtain a nano-filler slurry, where the filler is one or more selected from the group consisting of NAP, NZP, and nano-silicon dioxide;

2.2 mixing the nano-filler slurry with the epoxy resin, the MIO, and the talc powder to obtain a component C; and mixing the mixed solvent and the curing agent to obtain a component D; and 2.3 mixing the component C and the component D to obtain the slurry of the nano-epoxy MIO intermediate coating layer.

The slurry of the nano-epoxy MIO intermediate coating layer may specifically include a component C and a component D, and a mass ratio of the component C to the component D may be 1:1 to 10:1;

the component C may include:

| | |
|---|---|
| epoxy resin | 20% to 50%; |
| dispersing agent | 0.1% to 1%; |
| talc powder | 10% to 30%; |
| MIO | 10% to 50%; |
| NAP | 0% to 5%; |
| NZP | 0% to 5%; |
| nano-silicon dioxide | 0% to 5%; and |
| mixed solvent | 0% to 30%; | and
the component D may include:

| | |
|---|---|
| mixed solvent | 30% to 70%; and |
| curing agent | 30% to 70%. |

Preferably, a preparation method of the slurry of the nano-fluorocarbon top coating layer may specifically include:
3.1 mixing the PA wax, the mixed solvent, and the filler to obtain a nano-filler slurry, where the filler is one or more selected from the group consisting of NAP, NZP, and nano-silicon dioxide;
3.2 mixing the nano-filler slurry with the fluorocarbon resin and the defoaming agent to obtain a component E; and
mixing the solvent and the curing agent to obtain a component F; and
3.3 mixing the component E and the component F to obtain the slurry of the nano-fluorocarbon top coating layer.

The slurry of the nano-fluorocarbon top coating layer may specifically include a component E and a component F, and a mass ratio of the component E to the component F may be 5:1 to 10:1;

the component E may include:

| | |
|---|---|
| fluorocarbon resin | 30% to 80%; |
| defoaming agent | 0.1% to 1%; |
| PA wax | 0.1% to 1%; |
| NAP | 0% to 20%; |
| NZP | 0% to 5%; |
| nano-silicon dioxide | 0% to 5%; and |
| mixed solvent | 0% to 40%; | and
the component F may include:

| | |
|---|---|
| solvent | 10% to 50%; and |
| curing agent | 50% to 90%. |

It is found in the present application that the filler of the component A is first prepared into a nano-filler slurry, such as a nano-silicon dioxide slurry, a NAP slurry, or an NZP slurry, and then the nano-filler slurry is mixed with other components of the nano-zinc yellow epoxy primer layer, the nano-epoxy MIO intermediate coating layer, or the nano-fluorocarbon top coating layer, such that the nano-filler is evenly dispersed, which helps to improve the performance of the coating.

Preferably, a solid content of nano-silicon dioxide in the nano-silicon dioxide slurry of the component A may be 18%; a solid content of nano-silicon dioxide in the nano-silicon dioxide slurry of the component C may be 18%; a solid content of NAP in the NAP slurry of the component A may be 50%; a solid content of NAP in the NAP slurry of the component C may be 50%; a content of NZP in the NZP slurry of the component A may be 10%; and a content of NZP in the NZP slurry of the component C may be 10%.

Specifically, the nano-silicon dioxide of each of the component A, the component C, and the component E may have a particle size of 20 nm.

Specifically, the zinc phosphate of the component A may have a particle size of 325 mesh, the iron oxide yellow of the component A may have a particle size of 325 mesh, and the talc powder of the component A may have a particle size of 600 mesh; and the MIO of the component C may have a particle size of 400 mesh, and the talc powder of the component C may have a particle size of 800 mesh.

Preferably, the slurry of the rusty-surface liquid layer may have a pH of 2 to 5.

In a third aspect, the present application discloses use of the protective coating layer described above or a protective coating layer prepared by the preparation method described above in the corrosion prevention of a metal substrate.

Specifically, the metal substrate may be steel or galvanized steel.

The protective coating layer of the present application includes a rusty-surface liquid layer, a nano-zinc yellow epoxy primer layer, a nano-epoxy MIO intermediate coating layer, and a nano-fluorocarbon top coating layer. A slurry of the rusty-surface liquid layer is first used to directly treat a specific rusted surface of a substrate, such that the slurry of the rusty-surface liquid layer reacts with a rust layer to generate a conversion film, and then the nano-zinc yellow epoxy primer layer, the nano-epoxy MIO intermediate coating layer, and the nano-fluorocarbon top coating layer are sequentially applied. The nano-zinc yellow epoxy primer layer of the present application is a first layer of the protective coating layer, and is provided to increase the adhesion of other coating layers, the fullness of the protective coating layer, and the service life of the nano-fluorocarbon top coating layer, make the nano-fluorocarbon top coating layer well exhibit its characteristics, prevent the coating from penetrating through capillary pores and being absorbed, prevent alkaline substances of a substrate from penetrating to an upper layer, and reduce the amount of the nano-fluorocarbon top coating layer. The nano-epoxy MIO intermediate coating layer of the present application has prominent corrosion resistance and adhesion, and can improve the coating effect of the nano-fluorocarbon top coating layer and the overall corrosion resistance of a coating film and prolong the service life. The nano-epoxy MIO intermediate coating layer has strong adhesion and low water vapor permeability, and is an excellent shielding protective coating, which is suitable for intermediate coating layers of steel structures. Fluorocarbon bonds of fluorocarbon resin molecules in the nano-fluorocarbon top coating layer of the present application can resist the degradation of ultraviolet (UV) rays, and lead to extremely-excellent durability, UV resistance, and weather resistance, such that the nano-fluorocarbon top coating layer remains perfect and new for a long time, which reduces the requirements of repeated maintenance under on-site working conditions, the labor intensity, and the maintenance cost. Experimental results show that the protective coating layer of the present application has high adhesion, long service life, and anti-corrosion time of more than 15 years.

BRIEF DESCRIPTION OF THE DRAWINGS

To clearly illustrate the technical solutions in the examples of the present application or in the prior art, the accompanying drawings required in the description of the examples and the prior art will be briefly described below.

DETAILED DESCRIPTION

The present application provides a protective coating layer and a preparation method thereof, which effectively solve the technical defect that the existing protective coating layer with nanoparticles exhibits poor adhesion to a substrate and cannot provide a protective effect for a long time.

The technical solutions in the examples of the present application will be clearly and completely described below. Apparently, the described examples are merely some rather than all of the examples of the present application. All other examples obtained by those of ordinary skill in the art based on the examples of the present application without creative efforts should fall within the protection scope of the present application.

Characterization of the protective coating layer of the present application:

(1) Adhesion of the coating layer

An instrument used for an adhesion test is a PositestAT-A automatic pull-off adhesion tester produced by the Delelsko Company of the United States. A specific process of the adhesion test was as follows: To ensure the well bonding between an adhesion test aluminum column and an epoxy coating layer, surfaces of the epoxy coating layer and the adhesion test aluminum column were lightly polished with 400#sandpaper to make them rough, then washed with absolute alcohol to remove contaminants, and blow-dried; and then a surface of the coating layer and the stretching aluminum column (diameter: 20 mm) were bonded together with a fast-setting AB adhesive (a volume ratio of A to B was 1:1), and then placed at room temperature for 24 h to ensure the complete curing of the adhesive. To avoid the influence of an epoxy coating layer outside a test area on the adhesion of a coating layer inside the test area during the test, before the test, a circular blade with a diameter of 20 mm was used to separate the coating layers inside and outside the test area along a circumference of the test aluminum column. A critical adhesion strength required to pull the coating layer away from the substrate was then measured according to ISO 4624-2002, which was the adhesion of the coating layer to the metal. 6 replicate samples were adopted for each experimental group, and an average value was taken and determined as the final adhesion result.

(2) Photomacrograph

The macro-topographic pictures in the present application were all taken with a Nikon D 3100 digital camera produced by the Nikon Corporation.

(3) Salt spray test

The salt spray test was conducted with a YWX/Q salt spray corrosion test chamber of the Jiangsu Huaian Zhongya Testing Equipment Co., Ltd. according to the GB/T 1771-2007 standard. The salt spray test was conducted at 35±2° C. with a 5% NaCl solution being continuously sprayed. A percent grid was used to evaluate a bubbling area: microbubbles: simply visible to naked eyes; small bubbles: clearly visible to naked eyes, with a diameter of 0.5 mm or less; medium bubbles: with a diameter of 0.6 mm to 1 mm; and large bubbles: with a diameter of 1.1 mm or more.

(4) Xenon lamp aging test

A xenon arc lamp was used as an irradiation source for the xenon lamp aging test. Test samples were placed in a test chamber, and test conditions for the test samples remained consistent. The irradiance, black panel temperature, air temperature, and relative humidity in the test chamber could be automatically controlled. The xenon lamp aging test was conducted according to the GB/T 32088-2015 standard.

(5) TEM

A particle size of NZP was determined by a JEM-2100F transmission electron microscope (JEOL) at an acceleration voltage of 200 kV.

(6) The mechanical properties of the coating layer were also tested, including pencil hardness, impact strength, adhesion (scratching method and pull-off method), and flexibility. The gloss and thickness of the coating layer were also tested. The main test indexes are based on the following standards:
1) gloss of the coating layer: GB 1743-79;
2) thickness of the coating layer: GB 1764-79;
3) pencil hardness of the coating layer: GB/T 6739-2006;
4) impact strength of the coating layer: GB/T 20624.2-2006;
5) cross-cut test of colored and clear coating films: GB/T 9286-1998;
6) flexibility of the coating layer: GB/T1731-1993; and
7) adhesion of the coating layer by the pull-off method: GB/T 5210-2006.

The raw materials or reagents used in the following examples were commercially available or self-made; the dispersing agent was a BYK110 dispersing agent purchased from the BYK Chemie, Germany; the curing agent of each of the component B and the component D was PA purchased from the Jiangsu Sanmu Group, with a model of 650; the epoxy resin was a 75% E20 solution purchased from the Jiangsu Sanmu Group; the curing agent of the component F was purchased from the Bayer, Germany, with a model of N3390; the PA wax was purchased from the Tianjin Huanqi Chemical Co., Ltd., with a model of Ultra; the defoaming agent was purchased from the BYK Chemie, Germany, with a model of BYK065; and the fluorocarbon resin was purchased from Japan's Daikin, with a model of GK570.

Example 1

In this example, a first protective coating layer was provided, and a specific preparation process was as follows:
1. A slurry of a rusty-surface liquid layer, a slurry of a nano-zinc yellow epoxy primer layer, a slurry of a nano-epoxy MIO intermediate coating layer, and a slurry of a nano-fluorocarbon top coating layer were prepared.

The slurry of the rusty-surface liquid layer included: tannic acid: 15 g/L, phosphoric acid: 50 g/L, sodium molybdate: 4 g/L, citric acid: 1 g/L, and mixed alcohol: 20 g/L, where the mixed alcohol included IPA and TBA, and a mass ratio of the IPA to the TBA was 1:1.

The slurry of the nano-zinc yellow epoxy primer layer was prepared as follows:
1.1. A mixed solvent, a dispersing agent, and NAP were mixed in a mass ratio of 44:1:4 to obtain a NAP slurry; a mixed solvent, a dispersing agent, and NZP were mixed in a mass ratio of 44:1:4 to obtain an NZP slurry; and a mixed solvent, a dispersing agent, and nano-silicon dioxide were mixed in a mass ratio of 44:1:4 to obtain a nano-silicon dioxide slurry.
1.2. The NAP slurry, the NZP slurry, the nano-silicon dioxide slurry, an epoxy resin, zinc phosphate, iron oxide yellow, and a talc powder were mixed to obtain a component A, where a mass fraction of the epoxy resin in the component A was 50%, a mass fraction of the zinc phosphate in the component A was 20%, a mass fraction of the iron oxide yellow in the component A was 1%, a mass fraction of the talc powder in the component A was 26%, a mass fraction of the NAP slurry in the component A was 1%, a mass fraction of the NZP slurry in the component A was 1%, and a mass fraction of the nano-silicon dioxide slurry in the component A was 1%.

A mixed solvent was mixed with PA to obtain a component B, where a mass fraction of the mixed solvent in the component B was 40% and a mass fraction of the PA in the component B was 60%.
1.3. The component A and the component B were mixed in a mass ratio of 5:1 to obtain the slurry of the nano-zinc yellow epoxy primer layer.

The slurry of the nano-epoxy MIO intermediate coating layer was prepared as follows:
2.1. A mixed solvent, a dispersing agent, and NAP were mixed in a mass ratio of 90:1:5 to obtain a NAP slurry; a mixed solvent, a dispersing agent, and NZP were mixed in a mass ratio of 90:1:5 to obtain an NZP slurry; and a mixed solvent, a dispersing agent, and nano-silicon dioxide were mixed in a mass ratio of 90:1:5 to obtain a nano-silicon dioxide slurry.
2.2. The NAP slurry, the NZP slurry, the nano-silicon dioxide slurry, an epoxy resin, MIO, and a talc powder were mixed to obtain a component C, where a mass fraction of the epoxy resin in the component C was 50%, a mass fraction of the talc powder in the component C was 30%, a mass fraction of the MIO in the component C was 17%, a mass fraction of the NAP slurry in the component C was 1%, a mass fraction of the NZP slurry in the component C was 1%, and a mass fraction of the nano-silicon dioxide slurry in the component C was 1%.

A mixed solvent was mixed with PA to obtain a component D, where a mass fraction of the mixed solvent in the component D was 60% and a mass fraction of the PA in the component D was 40%.
2.3. The component C and the component D were mixed in a mass ratio of 5:1 to obtain the slurry of the nano-epoxy MIO intermediate coating layer.

The slurry of the nano-fluorocarbon top coating layer was prepared as follows:
3.1. PA wax, a mixed solvent, and NAP were mixed in a mass ratio of 1:70:2 to obtain a NAP slurry; PA wax, a mixed solvent, and NZP were mixed in a mass ratio of 1:70:2 to obtain an NZP slurry; and PA wax, a mixed solvent, and nano-silicon dioxide were mixed in a mass ratio of 1:70:2 to obtain a nano-silicon dioxide slurry.
3.2. The nano-filler slurries obtained in step 3.1, a fluorocarbon resin, and a defoaming agent were mixed to obtain a component E, where a mass fraction of the fluorocarbon resin in the component E was 80%, a mass fraction of the defoaming agent in the component E was 0.5%, a mass fraction of the PA wax in the component E was 0.5%, a mass fraction of the NAP slurry in the component E was 17%, a mass fraction of the NZP slurry in the component E was 1%, and a mass fraction of the nano-silicon dioxide slurry in the component E was 1%.

Butyl acetate was mixed with a curing agent N3390 to obtain a component F, where a mass fraction of the butyl acetate in the component F was 10% and a mass fraction of the curing agent N3390 in the component F was 90%.
3.3. The component E and the component F were mixed in a mass ratio of 10:1 to obtain the slurry of the nano-fluorocarbon top coating layer.

The mixed solvent of each of the component A, the component B, the component C, the component D, and the component E included xylene and NBA, and a volume ratio of the xylene to the NBA was 7:3.
2. The slurry of the rusty-surface liquid layer was coated on a rusted structural steel. The adhesion between the slurry of the rusty-surface liquid layer and the rusted structural steel was tested, which reached 5.7.
3. The slurry of the nano-zinc yellow epoxy primer layer prepared in step 1 was coated on a surface of the dried rusty-surface liquid layer. The adhesion between the rusty-surface liquid layer and the nano-zinc yellow epoxy primer layer was tested, which reached 18.
4. The slurry of the nano-epoxy MIO intermediate coating layer prepared in step 1 was coated on a surface of the dried nano-zinc yellow epoxy primer layer.
5. The slurry of the nano-fluorocarbon top coating layer prepared in step 1 was coated on a surface of the dried nano-epoxy MIO intermediate coating layer.

Example 2

In this example, a second protective coating layer was provided, and a specific preparation process was as follows:
1. A slurry of a rusty-surface liquid layer, a slurry of a nano-zinc yellow epoxy primer layer, a slurry of a nano-epoxy MIO intermediate coating layer, and a slurry of a nano-fluorocarbon top coating layer were prepared.

The slurry of the rusty-surface liquid layer included: tannic acid: 15 g/L, phosphoric acid: 50 g/L, sodium molybdate: 4 g/L, citric acid: 1 g/L, and mixed alcohol: 20 g/L, where the mixed alcohol included IPA and TBA, and a mass ratio of the IPA to the TBA was 1:1.

The slurry of the nano-zinc yellow epoxy primer layer was prepared as follows:

1.1. A mixed solvent, a dispersing agent, and NAP were mixed in a mass ratio of 44:1:4 to obtain a NAP slurry; a mixed solvent, a dispersing agent, and NZP were mixed in a mass ratio of 44:1:4 to obtain an NZP slurry; and a mixed solvent, a dispersing agent, and nano-silicon dioxide were mixed in a mass ratio of 44:1:4 to obtain a nano-silicon dioxide slurry.

1.2. The NAP slurry, the NZP slurry, the nano-silicon dioxide slurry, an epoxy resin, zinc phosphate, iron oxide yellow, and a talc powder were mixed to obtain a component A, where a mass fraction of the epoxy resin in the component A was 20%, a mass fraction of the zinc phosphate in the component A was 30%, a mass fraction of the iron oxide yellow in the component A was 5%, a mass fraction of the talc powder in the component A was 15%, a mass fraction of the NAP slurry in the component A was 10%, a mass fraction of the NZP slurry in the component A was 10%, and a mass fraction of the nano-silicon dioxide slurry in the component A was 10%.

A mixed solvent was mixed with PA to obtain a component B, where a mass fraction of the mixed solvent in the component B was 40% and a mass fraction of the PA in the component B was 60%.

1.3. The component A and the component B were mixed in a mass ratio of 1:1 to obtain the slurry of the nano-zinc yellow epoxy primer layer.

The slurry of the nano-epoxy MIO intermediate coating layer was prepared as follows:

2.1. A mixed solvent, a dispersing agent, and NAP were mixed in a mass ratio of 90:1:5 to obtain a NAP slurry; a mixed solvent, a dispersing agent, and NZP were mixed in a mass ratio of 90:1:5 to obtain an NZP slurry; and a mixed solvent, a dispersing agent, and nano-silicon dioxide were mixed in a mass ratio of 90:1:5 to obtain a nano-silicon dioxide slurry.

2.2. The NAP slurry, the NZP slurry, the nano-silicon dioxide slurry, an epoxy resin, MIO, and a talc powder were mixed to obtain a component C, where a mass fraction of the epoxy resin in the component C was 20%, a mass fraction of the talc powder in the component C was 30%, a mass fraction of the MIO in the component C was 35%, a mass fraction of the NAP slurry in the component C was 5%, a mass fraction of the NZP slurry in the component C was 5%, and a mass fraction of the nano-silicon dioxide slurry in the component C was 5%.

A mixed solvent was mixed with PA to obtain a component D, where a mass fraction of the mixed solvent in the component D was 60% and a mass fraction of the PA in the component D was 40%.

2.3. The component C and the component D were mixed in a mass ratio of 1:1 to obtain the slurry of the nano-epoxy MIO intermediate coating layer.

The slurry of the nano-fluorocarbon top coating layer was prepared as follows:

3.1. PA wax, a mixed solvent, and NAP were mixed in a mass ratio of 1:70:2 to obtain a NAP slurry; PA wax, a mixed solvent, and NZP were mixed in a mass ratio of 1:70:2 to obtain an NZP slurry; and PA wax, a mixed solvent, and nano-silicon dioxide were mixed in a mass ratio of 1:70:2 to obtain a nano-silicon dioxide slurry.

3.2. The nano-filler slurries obtained in step 3.1, a fluorocarbon resin, and a defoaming agent were mixed to obtain a component E, where a mass fraction of the fluorocarbon resin in the component E was 68%, a mass fraction of the defoaming agent in the component E was 1%, a mass fraction of the PA wax in the component E was 1%, a mass fraction of the NAP slurry in the component E was 20%, a mass fraction of the NZP slurry in the component E was 5%, and a mass fraction of the nano-silicon dioxide slurry in the component E was 5%.

Butyl acetate was mixed with a curing agent N3390 to obtain a component F, where a mass fraction of the butyl acetate in the component F was 50% and a mass fraction of the curing agent N3390 in the component F was 50%.

3.3. The component E and the component F were mixed in a mass ratio of 5:1 to obtain the slurry of the nano-fluorocarbon top coating layer.

The mixed solvent of each of the component A, the component B, the component C, the component D, and the component E included xylene and NBA, and a volume ratio of the xylene to the NBA was 7:3.

2. The slurry of the rusty-surface liquid layer was coated on a rusted structural steel. The adhesion between the slurry of the rusty-surface liquid layer and the rusted structural steel was tested, which reached 5.7.

3. The slurry of the nano-zinc yellow epoxy primer layer prepared in step 1 was coated on a surface of the dried rusty-surface liquid layer. The adhesion between the rusty-surface liquid layer and the nano-zinc yellow epoxy primer layer was tested, which reached 11.

4. The slurry of the nano-epoxy MIO intermediate coating layer prepared in step 1 was coated on a surface of the dried nano-zinc yellow epoxy primer layer.

5. The slurry of the nano-fluorocarbon top coating layer prepared in step 1 was coated on a surface of the dried nano-epoxy MIO intermediate coating layer.

Comparative Example 1

In this comparative example, a first control protective coating layer was provided, and the NAP, the NZP, and the nano-silicon dioxide were not added in the control protective coating layer.

The existing conventional coating, Zhongshan matching acrylic coating, was adopted. A primer of the Zhongshan matching acrylic coating includes the following components: epoxy resin, acrylonitrile, polyurethane (PU), and solvent; an intermediate coating of the Zhongshan matching acrylic coating includes the following components: epoxy resin, acrylonitrile, MIO, PU, and solvent; and a top coating of the Zhongshan matching acrylic coating includes the following components: toluene, chlorinated polypropylene (CPP), dimethylaminoethyl methacrylate (DMAEMA), methyl methacrylate (MMA), butyl acrylate (BA), styrene, and azodiisobutyronitrile (AIBN). A coating layer obtained from the Zhongshan matching acrylic coating was denoted as a control protective coating layer A.

The existing conventional coating, Zhongshan alkyd coating, was adopted. The Zhongshan alkyd coating includes solvent oil No. 200 and resin. A coating layer obtained from the Zhongshan alkyd coating was denoted as a control protective coating layer B.

Example 3

In this example, the adhesion of the nano-zinc yellow epoxy primer layers of Examples 1 and 2 and the control protective coating layer of Comparative Example 1 was tested.

1. The pull-off method was used to determine the adhesion of the nano-zinc yellow epoxy primer layers of Examples 1 and 2 and the control protective coating layer of Comparative Example 1, and results were shown in Table 1.

TABLE 1

Adhesion comparative test of the nano-zinc yellow epoxy primer layers of Examples 1 and 2 and the control protective coating layer of Comparative Example 1

| No. | Average adhesion value (MPa) |
|---|---|
| Example 1 | 18.5 |
| Example 2 | 11.8 |
| Comparative Example 1 | 7.9 |

2. The nano-zinc yellow epoxy primer layers of Examples 1 and 2 and a primer layer of the control protective coating layer A of Comparative Example 1 were each subjected to a salt spray test. The salt spray test results of the nano-zinc yellow epoxy primer layers in Examples 1 and 2 and the primer layer of the control protective coating layer A of Comparative Example 1 according to the present application were shown in FIG. 1.

Figure 1:
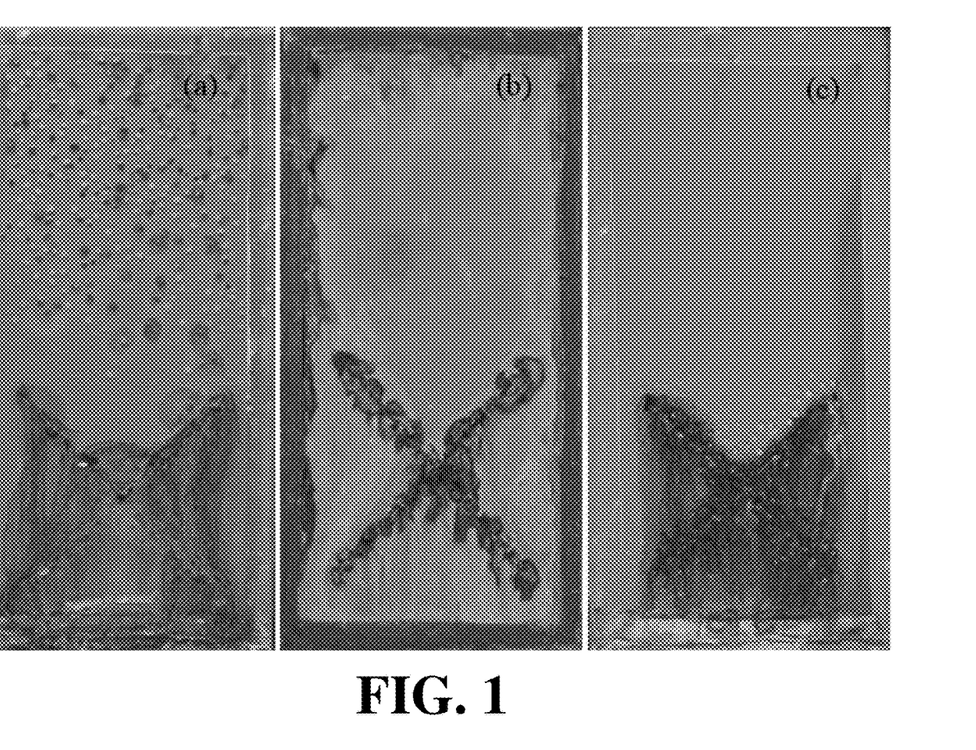
FIG. 1 shows the salt spray test results of the nano-zinc yellow epoxy primer layers in Examples 1 and 2 and the control protective coating layer A of Comparative Example 1 according to the present application.

It can be seen from FIG. 1 that, after the 2,000 h salt spray test, a cross-cut position of the primer layer of the control protective coating layer A of Comparative Example 1 was filled with corrosion products and was rusty nearby. In severe cases, rust spots appeared at positions other than cross-cut positions, indicating that the primer layer of the control protective coating layer A of Comparative Example 1 had many defects, the salt spray and salt water penetrated a substrate from the defective positions, and the substrate was corroded. Rusts only appeared at two sides of a cross-cut position of each of the nano-zinc yellow epoxy primer layers of Examples 1 and 2, there were no rust spots at other positions, and a surface of each of the coating layers was uniform and had no defects.

3. The nano-fluorocarbon top coating layers of Examples 1 and 2 and the control protective coating layer A and the control protective coating layer B of Comparative Example 1 were each subjected to a xenon lamp aging test. The color difference ΔE results of xenon lamp aging on the nano-fluorocarbon top coating layers in Examples 1 and 2 and the control protective coating layer A and the control protective coating layer B in Comparative Example 1 according to the present application were shown in FIG. 2; and the gloss loss rate results of xenon lamp aging on the nano-fluorocarbon top coating layers in Examples 1 and 2 and the control protective coating layer A and the control protective coating layer B in Comparative Example 1 according to the present application were shown in FIG. 3, where A represents the control protective coating layer A of Comparative Example 1, B represents the control protective coating layer B of Comparative Example 1, I represents the nano-fluorocarbon top coating layer of Example 1, and K represents the nano-fluorocarbon top coating layer of Example 2.

Figure 2:
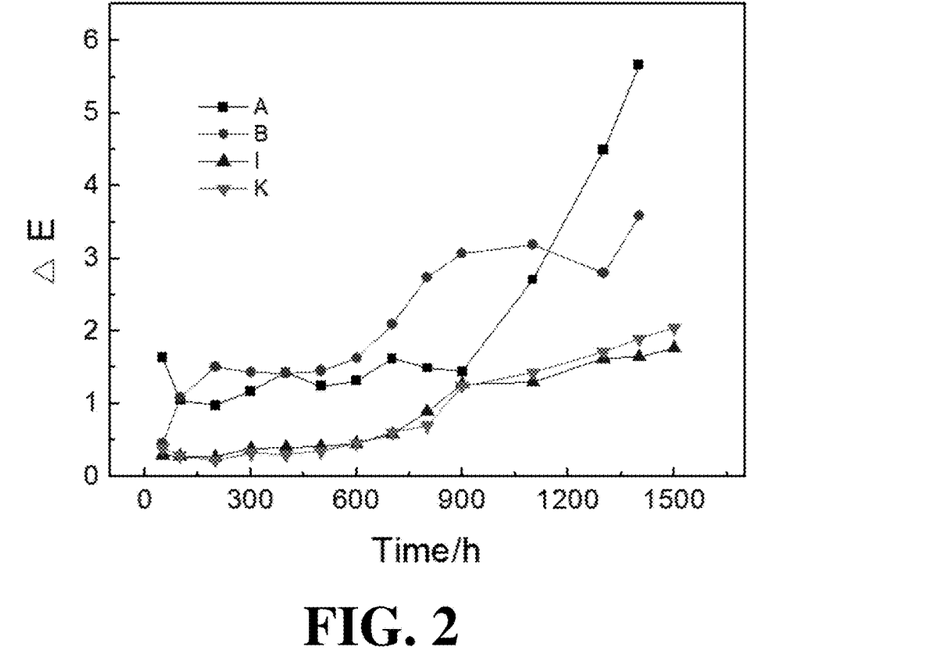
FIG. 2 shows the color difference ΔE results of xenon lamp aging on the nano-zinc yellow epoxy primer layers in Examples 1 and 2 and the control protective coating layer A and the control protective coating layer B in Comparative Example 1 according to the present application.
Figure 3:
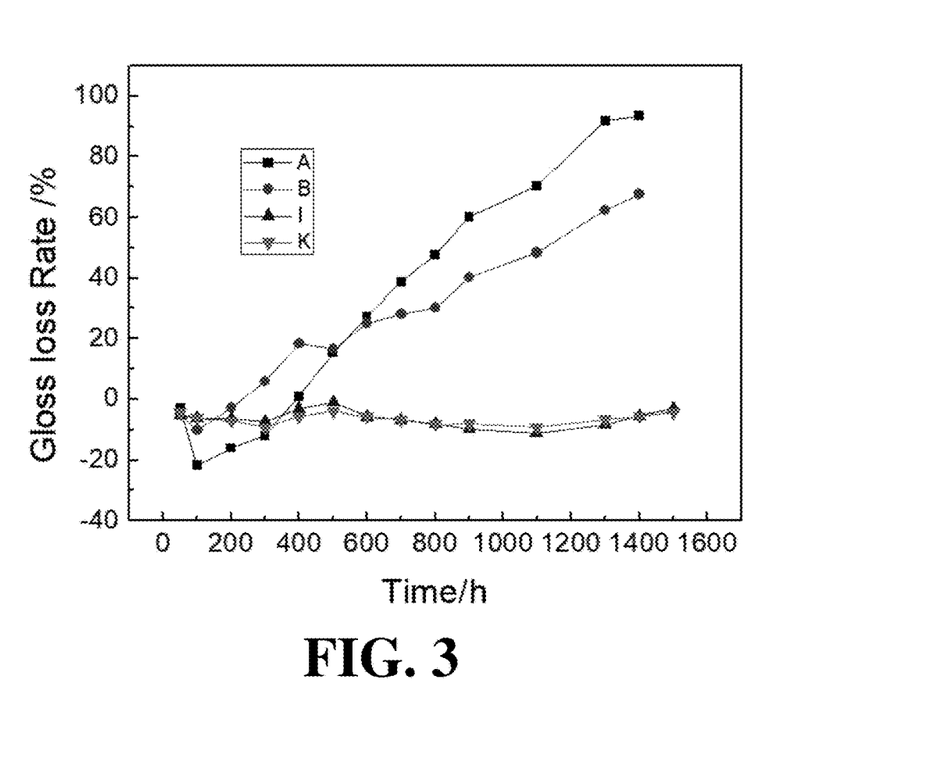
FIG. 3 shows the gloss loss rate results of xenon lamp aging on the nano-zinc yellow epoxy primer layers in Examples 1 and 2 and the control protective coating layer A and the control protective coating layer B in Comparative Example 1 according to the present application.

It can be seen from FIG. 2 that the color difference of each coating layer increased to some extent after the 1,500 h xenon lamp aging test; the color changes ΔE of the control protective coating layers A and B of Comparative Example 1 were 5.66 and 3.58, respectively; the color changes ΔE of the nano-zinc yellow epoxy primer layer I of Example 1 and the nano-fluorocarbon top coating layer K of Example 2 were 1.76 and 2.04, respectively; and the color changes of the nano-fluorocarbon top coating layers of Examples 1 and 2 were both smaller than those of the existing common control protective coating layers A and B of Comparative Example 1, indicating that the coating layers of Examples 1 and 2 had prominent weather resistance. It can be seen from the gloss loss rate curves in FIG. 3 that the existing common control protective coating layers A and B of Comparative Example 1 underwent heavy gloss loss, while the nano-fluorocarbon top coating layers of Examples 1 and 2 underwent light gloss loss and exhibited prominent weather resistance.

Example 4

In this example, rusty-surface liquid layers with different formulas were each subjected to an adhesion test, and a specific process was as follows:

A slurry of a rusty-surface liquid layer was prepared according to a formula in Table 2 and then subjected to an adhesion test, and results were shown in Table 3.

TABLE 2

| No. | Tannic acid (g/L) | $Na_2MoO_4$ (g/L) | Citric acid (g/L) | IPA/TBA (1:1) (g/L) | Temperature (° C.) |
|---|---|---|---|---|---|
| Test 1 | 5 | 1 | 1 | 5 | 20 |
| Test 2 | 5 | 2 | 2 | 10 | 25 |
| Test 3 | 5 | 3 | 3 | 15 | 30 |
| Test 4 | 5 | 4 | 4 | 20 | 35 |
| Test 5 | 10 | 1 | 2 | 15 | 35 |
| Test 6 | 10 | 2 | 1 | 20 | 30 |
| Test 7 | 10 | 3 | 4 | 5 | 25 |
| Test 8 | 10 | 4 | 3 | 10 | 20 |
| Test 9 | 15 | 1 | 3 | 20 | 25 |
| Test 10 | 15 | 2 | 4 | 15 | 20 |
| Test 11 | 15 | 3 | 1 | 10 | 35 |
| Test 12 | 15 | 4 | 2 | 5 | 30 |
| Test 13 | 20 | 1 | 4 | 10 | 30 |
| Test 14 | 20 | 2 | 3 | 5 | 35 |
| Test 15 | 20 | 3 | 2 | 20 | 20 |
| Test 16 | 20 | 4 | 1 | 15 | 25 |

TABLE 3

| No. | Adhesion (MPa) |
|---|---|
| Test 1 | 2.36 ± 0.22 |
| Test 2 | 2.89 ± 0.49 |
| Test 3 | 1.83 ± 0.65 |
| Test 4 | 4.22 ± 0.22 |
| Test 5 | 1.94 ± 0.48 |
| Test 6 | 2.70 ± 0.47 |
| Test 7 | 2.80 ± 0.51 |
| Test 8 | 2.11 ± 0.20 |
| Test 9 | 3.27 ± 0.64 |
| Test 10 | 2.76 ± 0.34 |
| Test 11 | 3.70 ± 0.70 |
| Test 12 | 1.95 ± 0.50 |
| Test 13 | 2.36 ± 0.21 |
| Test 14 | 2.39 ± 0.56 |
| Test 15 | 2.22 ± 0.33 |
| Test 16 | 3.42 ± 0.44 |

It can be seen from Table 3 that, with the increase of a tannic acid concentration or the increase of a treatment temperature, the adhesion first decreased, then increased, and then decreased; when the tannic acid concentration was 15 g/L or the treatment temperature was 25° C., the respective maximum adhesion was achieved; an adhesion value at 35° C. was very close to that at 25° C., but considering the actual construction conditions, 25° C. was preferred; with the increase of sodium molybdate and mixed alcohol concentrations, the adhesion basically showed an upward trend; when a sodium molybdate concentration was 4 g/L and a mixed alcohol concentration was 20 g/L, the respective maximum adhesion was achieved; and with the increase of a citric acid concentration, the adhesion first decreased and then increased, and the maximum adhesion value was achieved when the citric acid concentration was 1 g/L.

A preferred formula of the slurry of the rusty-surface liquid layer in this example included: tannic acid: 15 g/L, sodium molybdate: 4 g/L, citric acid: 1 g/L, and mixed alcohol (the mixed alcohol included IPA and TBA, and a mass ratio of the IPA to the TBA was 1:1): 20 g/L; and treatment temperature: 25° C.

If a rusted structural steel was not treated with the slurry of the rusty-surface liquid layer, the adhesion between the nano-zinc yellow epoxy primer layer and the rusted structural steel was 1.93 MPa. If a rusted structural steel was treated with the slurry of the rusty-surface liquid layer of the above formula, the adhesion between the nano-zinc yellow epoxy primer layer and the rusted structural steel was 5.97 MPa. It can be seen that the slurry of the rusty-surface liquid layer of the above formula: tannic acid: 15 g/L, sodium molybdate: 4 g/L, citric acid: 1 g/L, and mixed alcohol (the mixed alcohol included IPA and TBA, and a mass ratio of the IPA to the TBA was 1:1): 20 g/L; and treatment temperature: 25° C., could improve the adhesion between the nano-zinc yellow epoxy primer layer and the rusted structural steel.

Example 5

Figure 4:
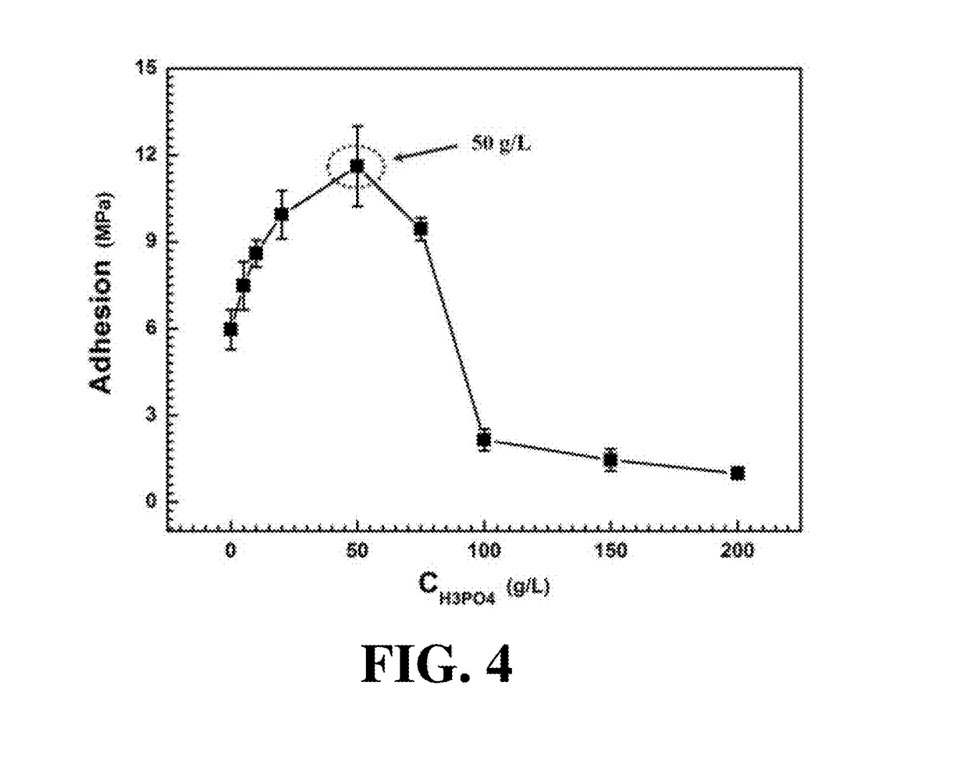
FIG. 4 shows the influence of rusty-surface liquid layer slurries with different phosphoric acid concentrations provided in the present application on the adhesion between a nano-zinc yellow epoxy primer layer and a rusted structural steel.

In this example, rusty-surface liquid layers with different phosphoric acid concentrations were each subjected to an adhesion test, and a specific process was as follows:
1. The slurry of the rusty-surface liquid layer in this example included: tannic acid: 15 g/L, sodium molybdate: 4 g/L, citric acid: 1 g/L, and mixed alcohol (the mixed alcohol included IPA and TBA, and a mass ratio of the IPA to the TBA was 1:1): 20 g/L, which were mixed and treated at 25° C. to obtain a base solution with a pH of 2.58.
2. Phosphoric acid was added to the base solution in step 1 at different concentrations to obtain rusty-surface liquid layer slurries at different phosphoric acid concentrations of 0 g/L, 10 g/L, 20 g/L, 30 g/L, 40 g/L, 50 g/L, 75 g/L, 100 g/L, 150 g/L, and 200 g/L. A rusted structural steel was treated with the rusty-surface liquid layer slurries at different phosphoric acid concentrations, and then the adhesion between the nano-zinc yellow epoxy primer layer and the rusted structural steel was tested. The influence of the rusty-surface liquid layer slurries at different phosphoric acid concentrations provided in the example on the adhesion between the nano-zinc yellow epoxy primer layer and the rusted structural steel was shown in FIG. 4. It can be seen from FIG. 4 that, at an initial stage of the increase of phosphoric acid concentration, the adhesion increased constantly with the increase of phosphoric acid concentration; when the phosphoric acid concentration was 50 g/L, the maximum adhesion value of 11.63 MPa was achieved, which was much higher than 1.93 MPa achieved without the rusty-surface liquid layer treatment and 5.97 MPa achieved with the base solution treatment in step 1; when the phosphoric acid concentration was greater than 50 g/L, the adhesion began to drop sharply; and when the phosphoric acid concentration increased to 150 g/L and 200 g/L, the adhesion even dropped to 1.45 MPa and 0.99 MPa, respectively, which were much smaller than 1.93 MPa achieved without the rusty-surface liquid layer treatment. It indicates that the addition of an appropriate amount of phosphoric acid to the slurry of the rusty-surface liquid layer with tannic acid can significantly improve the adhesion, but a high phosphoric acid concentration will reduce the adhesion.
3. Phosphoric acid was added at a concentration of 50 g/L to the base solution in step 1 to prepare a preferred rusty-surface liquid layer slurry; and due to the addition of phosphoric acid, the preferred rusty-surface liquid layer slurry had a pH of 0.38.

Hydrochloric acid was added to the base solution in step 1 to prepare a comparative slurry 1 with a pH of 0.38.

Phosphoric acid was added at a concentration of 50 g/L to the base solution in step 1 to prepare a preferred rusty-surface liquid layer slurry, and then a pH of the preferred rusty-surface liquid layer slurry was adjusted to 2.58 with sodium hydroxide to prepare a comparative slurry 2 with a pH of 2.58.

To eliminate the influence of phosphate, a pH of the preferred rusty-surface liquid layer slurry was adjusted to 0.38 with a hydrochloric acid solution instead of phosphoric acid; and to eliminate the influence of pH, 50 g/L phosphoric acid was first added to the base solution, and then a pH was adjusted to 2.58 with a sodium hydroxide solution. The preferred rusty-surface liquid layer slurry, the comparative slurry 1, and the comparative slurry 2 were each used to treat a rusted structural steel, and then the adhesion between the nano-zinc yellow epoxy primer layer and the rusted structural steel was determined. The influence of pH and phosphate on the adhesion between the nano-zinc yellow epoxy primer layer and the rusted structural steel was shown in FIG. 4 (error bar: standard deviation (SD)). It can be seen from FIG. 4 that the addition of 50 g/L phosphoric acid to the preferred rusty-surface liquid layer slurry can improve the adhesion because a reaction rate between the preferred rusty-surface liquid layer slurry and a rust layer is effectively controlled under the combined action of hydrogen and phosphate ions and a conversion film structure with some narrow channels is formed, which is conducive to the penetration of the preferred rusty-surface liquid layer slurry into an inner rust layer for reaction and finally increases a conversion degree of the rust layer to form a relatively dense conversion film guaranteeing the cohesion. In addition, a surface of the conversion film has microcracks and many active functional groups, which are conducive to the strong bonding between the conversion film and the nano-zinc yellow epoxy primer layer through mechanical interlocking and chemical bonds.

Example 6

In this example, a slurry of a nano-zinc yellow epoxy primer layer was subjected to an adhesion test, and specific steps were as follows:

The slurry of the nano-zinc yellow epoxy primer layer was prepared as follows:
1.1. A mixed solvent, a dispersing agent, and NAP were mixed in a mass ratio of 44:1:4 to obtain a NAP slurry; a mixed solvent, a dispersing agent, and NZP were mixed in a mass ratio of 44:1:4 to obtain an NZP slurry; and a mixed solvent, a dispersing agent, and nano-silicon dioxide were mixed in a mass ratio of 44:1:4 to obtain a nano-silicon dioxide slurry.

1.2. The NAP slurry, the NZP slurry, the nano-silicon dioxide slurry, an epoxy resin, zinc phosphate, iron oxide yellow, and a talc powder were mixed to obtain a component A, where a mass fraction of the epoxy resin in the component A was 50%, a mass fraction of the zinc phosphate in the component A was 20%, a mass fraction of the iron oxide yellow in the component A was 1%, a mass fraction of the talc powder in the component A was 26%, a mass fraction of the NAP slurry in the component A was 1%, a mass fraction of the NZP slurry in the component A was 1%, and a mass fraction of the nano-silicon dioxide slurry in the component A was 1%.

A mixed solvent was mixed with PA to obtain a component B, where a mass fraction of the mixed solvent in the component B was 40% and a mass fraction of the PA in the component B was 60%; and the mixed solvent included xylene and NBA, and a volume ratio of the xylene to the NBA was 7:3.

1.3. The component A and the component B were mixed in a mass ratio of 5:1 to obtain the slurry of the nano-zinc yellow epoxy primer layer.

2. Preparation of a control group: A preparation method of the control group was the same as the preparation method of the slurry of the nano-zinc yellow epoxy primer layer in this example, except that the NAP, the NZP, and the nano-silicon dioxide were not added in the control group of this example.

3. The adhesion was determined by a pull-off method for the experimental group and the control group in steps 1 and 2, and results were shown in Table 4.

TABLE 4

| Group | Average value of two plates (MPa) |
|---|---|
| Control group | 5.3 |
| Experimental group | 11.8 |

4. The physical and chemical properties of the nano-zinc yellow epoxy primer layer slurries in this example were determined, and results were shown in Table 7.

It can be seen from Table 4 that the nano-zinc yellow epoxy primer layers in this example exhibited excellent mechanical properties and adhesion to a substrate.

Example 7

In this example, a slurry of a nano-epoxy MIO intermediate coating layer was specifically prepared as follows:

The slurry of the nano-epoxy MIO intermediate coating layer was prepared as follows:

2.1. A mixed solvent, a dispersing agent, and NAP were mixed in a mass ratio of 90:1:5 to obtain a NAP slurry; a mixed solvent, a dispersing agent, and NZP were mixed in a mass ratio of 90:1:5 to obtain an NZP slurry; and a mixed solvent, a dispersing agent, and nano-silicon dioxide were mixed in a mass ratio of 90:1:5 to obtain a nano-silicon dioxide slurry.

2.2. The NAP slurry, the NZP slurry, the nano-silicon dioxide slurry, an epoxy resin, MIO, and a talc powder were mixed to obtain a component C, where a mass fraction of the epoxy resin in the component C was 50%, a mass fraction of the talc powder in the component C was 30%, a mass fraction of the MIO in the component C was 17%, a mass fraction of the NAP slurry in the component C was 1%, a mass fraction of the NZP slurry in the component C was 1%, and a mass fraction of the nano-silicon dioxide slurry in the component C was 1%.

A mixed solvent was mixed with PA to obtain a component D, where a mass fraction of the mixed solvent in the component D was 60% and a mass fraction of the PA in the component D was 40%; and the mixed solvent included xylene and NBA, and a volume ratio of the xylene to the NBA was 7:3.

2.3. The component C and the component D were mixed in a mass ratio of 5:1 to obtain the slurry of the nano-epoxy MIO intermediate coating layer.

2. Preparation of a control group: A preparation method of the control group was the same as the preparation method of the slurry of the nano-epoxy MIO intermediate coating layer in this example, except that the NAP, the NZP, and the nano-silicon dioxide were not added in the control group of this example.

3. The adhesion was determined by a pull-off method for the experimental group and the control group in steps 1 and 2, and results were shown in Table 5.

TABLE 5

| Group | Average value of two plates (MPa) |
|---|---|
| Control group | 5.7 |
| Experimental group | 11.1 |

4. The physical and chemical properties of the nano-epoxy MIO intermediate coating layer slurries in this example were determined, and results were shown in Table 7.

It can be seen from Table 5 that the nano-epoxy MIO intermediate coating layer layers in this example exhibited excellent mechanical properties and adhesion to a substrate.

Example 8

In this example, a slurry of a nano-fluorocarbon top coating layer was specifically prepared as follows:

The slurry of the nano-fluorocarbon top coating layer was prepared as follows:

3.1. PA wax, a mixed solvent, and NAP were mixed in a mass ratio of 1:70:2 to obtain a NAP slurry; PA wax, a mixed solvent, and NZP were mixed in a mass ratio of 1:70:2 to obtain an NZP slurry; and PA wax, a mixed solvent, and nano-silicon dioxide were mixed in a mass ratio of 1:70:2 to obtain a nano-silicon dioxide slurry.

3.2. The nano-filler slurries obtained in step 3.1, a fluorocarbon resin, and a defoaming agent were mixed to obtain a component E, where a mass fraction of the fluorocarbon resin in the component E was 80%, a mass fraction of the defoaming agent in the component E was 0.5%, a mass fraction of the PA wax in the component E was 0.5%, a mass fraction of the NAP slurry in the component E was 17%, a mass fraction of the NZP slurry in the component E was 1%, and a mass fraction of the nano-silicon dioxide slurry in the component E was 1%.

Butyl acetate was mixed with a curing agent N3390 to obtain a component F, where a mass fraction of the butyl acetate in the component F was 10% and a mass fraction of the curing agent N3390 in the component F was 90%.

3.3. The component E and the component F were mixed in a mass ratio of 10:1 to obtain the slurry of the nano-fluorocarbon top coating layer.

2. Preparation of a control group: A preparation method of the control group was the same as the preparation method of the slurry of the nano-fluorocarbon top coating layer in this example, except that the NAP, the NZP, and the nano-silicon dioxide were not added in the control group of this example.

3. The performance was tested for the experimental group and the control group in steps 1 and 2, and results were shown in Table 6.

TABLE 6

| Group | Thickness (μm) | Pencil hardness | Flexibility (mm) | Adhesion (grade) | Impact strength (kg · cm) |
|---|---|---|---|---|---|
| Control group | 24 ± 2 | H | 1 | 1 | 50 |
| Experimental group | 23 ± 2 | H | 1 | 0 | 50 |

It can be seen from Table 6 that the adhesion of the nano-fluorocarbon top coating layer in this example was at the highest grade 0, while the adhesion of the existing conventional top coating layer was at grade 1.

4. The physical and chemical properties of the nano-fluorocarbon top coating layer slurries in this example were determined, and results were shown in Table 7.

TABLE 7

| Test item | Experimental group in Example 6 | Experimental group in Example 7 | Experimental group in Example 8 |
|---|---|---|---|
| Viscosity (TU-4 viscosity cup, 25° C.) | 44 | 69 | 18 |
| Drying time (h), surface dry | 0.3 | 1 | 2.5 |
| Drying time (h), hard dry | 4.5 | 5.5 | 8.5 |
| Thickness (μm) | 28 ± 2 | 34 ± 2 | 24 ± 2 |
| Gloss (60°) | 1.5 ± 1 | 4.7 ± 3 | 155 ± 5 |
| Pencil hardness | H | 2H | HB |
| Adhesion (grade) | 1 | 1 | 1 |
| Flexibility (mm) | 2 | 1 | 1 |
| Impact strength (kg · cm) | 50 | 50 | 50 |

Example 9

In this example, different nano-zinc yellow epoxy primer layer slurries were prepared through the addition of nano-silicon dioxide by different methods, and each subjected to a dispersion test. A specific process was as follows:

1. Preparation of a nano-zinc yellow epoxy primer layer slurry test group:

1.1. A mixed solvent, a dispersing agent, and nano-silicon dioxide were mixed in a mass ratio of 44:1:4 to obtain a nano-silicon dioxide slurry.

1.2. The nano-silicon dioxide slurry, an epoxy resin, zinc phosphate, iron oxide yellow, and a talc powder were mixed to obtain a component A, where a mass fraction of the epoxy resin in the component A was 50%, a mass fraction of the zinc phosphate in the component A was 20%, a mass fraction of the iron oxide yellow in the component A was 1%, a mass fraction of the talc powder in the component A was 26%, and a mass fraction of the nano-silicon dioxide slurry in the component A was 1%.

A mixed solvent was mixed with PA to obtain a component B, where a mass fraction of the mixed solvent in the component B was 40% and a mass fraction of the PA in the component B was 60%; and the mixed solvent included xylene and NBA, and a volume ratio of the xylene to the NBA was 7:3.

1.3. The component A and the component B were mixed in a mass ratio of 5:1 to obtain a slurry of a nano-zinc yellow epoxy primer layer.

2. Preparation of a control group: A preparation method of the control group was the same as the preparation method of the slurry of the nano-zinc yellow epoxy primer layer in this example, except that, in the control group of this example, the nano-silicon dioxide was not prepared into a nano-silicon dioxide slurry, but was directly mixed with the remaining components to obtain a control group slurry.

Figure 5:
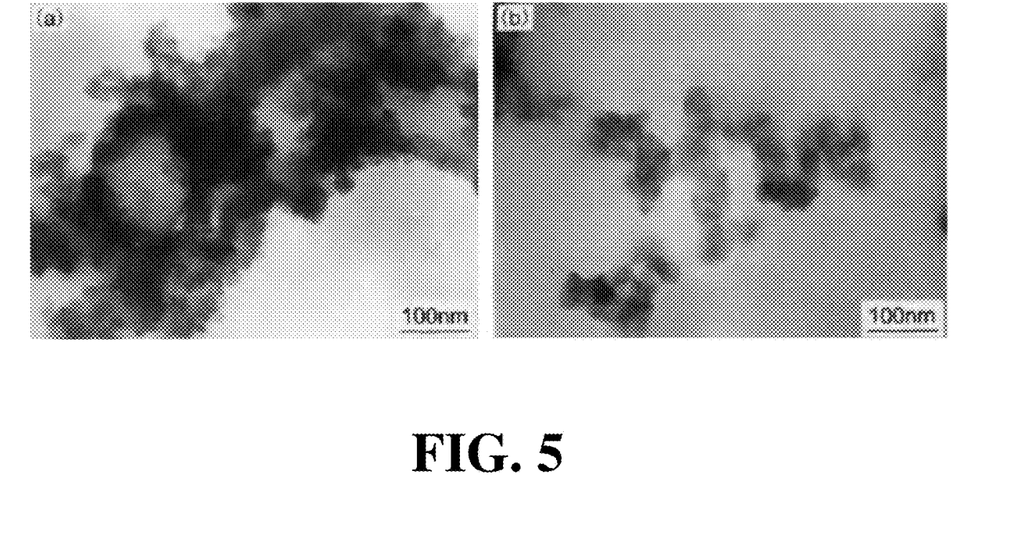
FIG. 5 shows the transmission electron microscopy (TEM) images of a nano-zinc yellow epoxy primer layer slurry prepared directly from nano-silicon dioxide and the nano-zinc yellow epoxy primer layer slurry prepared from a nano-silicon dioxide slurry provided in the example of the present application, where (a) shows the control group slurry prepared directly from the nano-silicon dioxide, and (b) shows the test group slurry prepared from the nano-silicon dioxide slurry.

3. The test group slurry in step 1 and the control group slurry in step 2 were each subjected to scanning electron microscopy (SEM) analysis, and results were shown in FIG. 5. FIG. 5 shows the TEM images of the nano-zinc yellow epoxy primer layer slurry prepared directly from nano-silicon dioxide and the nano-zinc yellow epoxy primer layer slurry prepared from a nano-silicon dioxide slurry provided in the example of the present application, where (a) shows the control group slurry prepared directly from the nano-silicon dioxide, and (b) shows the test group slurry prepared from the nano-silicon dioxide slurry. It can be seen from FIG. 5 that nanoparticles in the nano-zinc yellow epoxy primer layer slurry prepared from the nano-silicon dioxide slurry are evenly dispersed with very few agglomerates; and nanoparticles in the control group slurry prepared directly from the nano-silicon dioxide are unevenly dispersed with many agglomerates. This is because the original agglomerates in the nano-silicon dioxide are broken after the nano-silicon dioxide is prepared into the nano-silicon dioxide slurry, and a hyperdispersing agent solution is used for wetting to form an adsorption layer, such that a stablely-dispersed nano-silicon dioxide slurry is obtained; and after the nano-silicon dioxide slurry is mixed with the remaining raw materials of the nano-zinc yellow epoxy primer layer slurry, the adsorption layer on a surface of nano-silicon dioxide particles will not be affected by the remaining raw materials of the nano-zinc yellow epoxy primer layer slurry due to an anchoring effect of the hyperdispersing agent, such that the nano-silicon dioxide particles can be stably dispersed in the nano-zinc yellow epoxy primer layer slurry, and can still be in a prominent dispersion state after film formation.

The above are merely preferred implementations of the present application. It should be noted that a person of ordinary skill in the art may further make several improvements and modifications without departing from the principle of the present application, but such improvements and modifications should be deemed as falling within the protection scope of the present application.

The invention claimed is:

1. A protective coating layer, comprising: a rusty-surface liquid layer, a nano-zinc yellow epoxy primer layer, a nano-epoxy micaceous iron oxide (MIO) intermediate coating layer, and a nano-fluorocarbon top coating layer, wherein the rusty-surface liquid layer is applied on a metal substrate; the nano-zinc yellow epoxy primer layer is applied on a surface of the rusty-surface liquid layer; the nano-epoxy MIO intermediate coating layer is applied on a surface of the nano-zinc yellow epoxy primer layer; and the nano-fluorocarbon top coating layer is applied on a surface of the nano-epoxy MIO intermediate coating layer;

a slurry of the rusty-surface liquid layer comprises:
tannic acid 5 g/L to 20 g/L;
phosphoric acid 0 g/L to 200 g/L;
sodium molybdate 1 g/L to 4 g/L;
citric acid 1 g/L to 4 g/L;
mixed alcohol 5 g/L to 20 g/L, wherein the mixed alcohol comprises isopropyl alcohol (IPA) and tertiary butyl alcohol (TBA), and a mass ratio of the IPA to the TBA is 1:1; and
sodium dodecylbenzenesulfonate (SDBS) 0.5 g/L to 5 g/L;
a slurry of the nano-zinc yellow epoxy primer layer comprises an epoxy resin, a dispersing agent, zinc phosphate, iron oxide yellow, talc powder, a filler, a mixed solvent, and a curing agent, wherein the filler is one or more selected from the group consisting of nano-aluminum powder (NAP), nano-zirconium powder (NZP), and nano-silicon dioxide;
a slurry of the nano-epoxy MIO intermediate coating layer comprises an epoxy resin, a dispersing agent, talc powder, MIO, a filler, a mixed solvent, and a curing agent, wherein the filler is one or more selected from the group consisting of NAP, NZP, and nano-silicon dioxide; and
a slurry of the nano-fluorocarbon top coating layer comprises a fluorocarbon resin, a defoaming agent, a polyamide (PA) wax, a mixed solvent, a filler, a solvent, and a curing agent, wherein the filler is one or more selected from the group consisting of NAP, NZP, and nano-silicon dioxide.

2. The protective coating layer according to claim 1, wherein the slurry of the nano-zinc yellow epoxy primer layer specifically comprises a component A and a component B, and a mass ratio of the component A to the component B is (1-10): 1;
the component A comprises:

| | |
|---|---|
| epoxy resin | 20% to 50%; |
| dispersing agent | 0.1% to 1%; |
| zinc phosphate | 20% to 30%; |
| iron oxide yellow | 1% to 5%; |
| talc powder | 10% to 30%; |
| NAP | 0% to 10%; |
| NZP | 0% to 10%; |
| nano-silicon dioxide | 0% to 10%; and |
| mixed solvent | 0% to 30%; and |
| the component B comprises: | |
| mixed solvent | 30% to 70%; and |
| curing agent | 30% to 70%. |

3. The protective coating layer according to claim 1, wherein the slurry of the nano-epoxy MIO intermediate coating layer specifically comprises a component C and a component D, and a mass ratio of the component C to the component D is (1-10): 1;
the component C comprises:

| | |
|---|---|
| epoxy resin | 20% to 50%; |
| dispersing agent | 0.1% to 1%; |
| talc powder | 10% to 30%; |
| MIO | 10% to 50%; |
| NAP | 0% to 5%; |
| NZP | 0% to 5%; |
| nano-silicon dioxide | 0% to 5%; and |
| mixed solvent | 0% to 30%; and |
| the component D comprises: | |
| mixed solvent | 30% to 70%; and |
| curing agent | 30% to 70%. |

4. The protective coating layer according to claim 1, wherein the slurry of the nano-fluorocarbon top coating layer specifically comprises a component E and a component F, and a mass ratio of the component E to the component F is (5-10): 1;
the component E comprises:

| | |
|---|---|
| fluorocarbon resin | 30% to 80%; |
| defoaming agent | 0.1% to 1%; |
| PA wax | 0.1% to 1%; |
| NAP | 0% to 20%; |
| NZP | 0% to 5%; |
| nano-silicon dioxide | 0% to 5%; and |
| mixed solvent | 0% to 40%; and |
| the component F comprises: | |
| solvent | 10% to 50%; and |
| curing agent | 50% to 90%. |

5. A preparation method of the protective coating layer according to claim 1, comprising the following steps:
step 1. preparing a slurry of the rusty-surface liquid layer, a slurry of the nano-zinc yellow epoxy primer layer, a slurry of the nano-epoxy MIO intermediate coating layer, and a slurry of the nano-fluorocarbon top coating layer;
step 2. applying the slurry of the rusty-surface liquid layer on a metal substrate;
step 3. applying the slurry of the nano-zinc yellow epoxy primer layer on a surface of the rusty-surface liquid layer;
step 4. applying the slurry of the nano-epoxy MIO intermediate coating layer on a surface of the nano-zinc yellow epoxy primer layer; and
step 5. applying the slurry of the nano-fluorocarbon top coating layer on a surface of the nano-epoxy MIO intermediate coating layer,
wherein the slurry of the rusty-surface liquid layer comprises:
tannic acid 5 g/L to 20 g/L;
phosphoric acid 0 g/L to 200 g/L;
sodium molybdate 1 g/L to 4 g/L;
citric acid 1 g/L to 4 g/L;
mixed alcohol 5 g/L to 20 g/L, wherein the mixed alcohol comprises isopropyl alcohol (IPA) and tertiary butyl alcohol (TBA), and a mass ratio of the IPA to the TBA is 1:1; and
sodium dodecylbenzenesulfonate (SDBS) 0.5 g/L to 5 g/L;
the slurry of the nano-zinc yellow epoxy primer layer comprises an epoxy resin, a dispersing agent, zinc phosphate, iron oxide yellow, talc powder, a filler, a mixed solvent, and a curing agent, wherein the filler is one or more selected from the group consisting of NAP, NZP, and nano-silicon dioxide;
the slurry of the nano-epoxy MIO intermediate coating layer comprises an epoxy resin, a dispersing agent, talc powder, MIO, a filler, a mixed solvent, and a curing agent, wherein the filler is one or more selected from the group consisting of NAP, NZP, and nano-silicon dioxide; and the slurry of the nano-fluorocarbon top coating layer comprises a fluorocarbon resin, a defoaming agent, a PA wax, a mixed solvent, a filler, a solvent, and a curing agent, wherein the filler is one or more selected from the group consisting of NAP, NZP, and nano-silicon dioxide.

6. The preparation method according to claim 5, wherein a preparation method of the slurry of the nano-zinc yellow epoxy primer layer specifically comprises:

1.1 mixing the dispersing agent, the mixed solvent, and the filler to obtain a nano-filler slurry, wherein the filler is one or more selected from the group consisting of NAP, NZP, and nano-silicon dioxide;

1.2 mixing the nano-filler slurry with the epoxy resin, the zinc phosphate, the iron oxide yellow, and the talc powder to obtain a component A; and mixing the mixed solvent and the curing agent to obtain a component B; and 1.3 mixing the component A and the component B to obtain the slurry of the nano-zinc yellow epoxy primer layer.

7. The preparation method according to claim 5, wherein a preparation method of the slurry of the nano-epoxy MIO intermediate coating layer specifically comprises:

2.1 mixing the dispersing agent, the mixed solvent, and the filler to obtain a nano-filler slurry, wherein the filler is one or more selected from the group consisting of NAP, NZP, and nano-silicon dioxide;

2.2 mixing the nano-filler slurry with the epoxy resin, the MIO, and the talc powder to obtain a component C; and mixing the mixed solvent and the curing agent to obtain a component D; and 2.3 mixing the component C and the component D to obtain the slurry of the nano-epoxy MIO intermediate coating layer.

8. The preparation method according to claim 5, wherein a preparation method of the slurry of the nano-fluorocarbon top coating layer specifically comprises:

3.1 mixing the PA wax, the mixed solvent, and the filler to obtain a nano-filler slurry, wherein the filler is one or more selected from the group consisting of NAP, NZP, and nano-silicon dioxide;

3.2 mixing the nano-filler slurry with the fluorocarbon resin and the defoaming agent to obtain a component E; and mixing the solvent and the curing agent to obtain a component F; and 3.3 mixing the component E and the component F to obtain the slurry of the nano-fluorocarbon top coating layer.

9. A method for corrosion prevention of a metal substrate, comprising using the protective coating layer prepared by the preparation method according to claim 5.

10. A method for corrosion prevention of a metal substrate, comprising using the protective coating layer according to claim 1.

\* \* \* \* \*